United States Patent [19]
Tabata et al.

[11] Patent Number: 5,742,262
[45] Date of Patent: Apr. 21, 1998

[54] IMAGE DISPLAY APPARATUS

[75] Inventors: Seiichiro Tabata, Hino; Yoichi Iba, Hachioji, both of Japan

[73] Assignee: Olympus Optical Co., Ltd., Tokyo, Japan

[21] Appl. No.: 264,065

[22] Filed: Jun. 22, 1994

[30] Foreign Application Priority Data

Jun. 23, 1993 [JP] Japan .................................. 5-151719
Mar. 11, 1994 [JP] Japan .................................. 6-041166

[51] Int. Cl.⁶ .............................. H04N 5/64; H04N 17/00
[52] U.S. Cl. ...................................................... 345/8
[58] Field of Search ............................ 345/8, 7, 9, 38

[56] References Cited

U.S. PATENT DOCUMENTS

| | | |
|---|---|---|
| 4,636,866 | 1/1987 | Hattori . |
| 5,035,473 | 7/1991 | Kuwayama et al. .......... 359/630 |
| 5,106,179 | 4/1992 | Kamaya et al. . |
| 5,539,528 | 7/1996 | Togino et al. ................ 359/630 |

FOREIGN PATENT DOCUMENTS

| | | |
|---|---|---|
| 3214872 | 9/1991 | Japan . |
| 4170512 | 6/1992 | Japan . |

*Primary Examiner*—Mark R. Powell
*Attorney, Agent, or Firm*—Cushman, Darby & Cushman IP Group of Pillsbury Madison & Sutro LLP

[57] ABSTRACT

An image display apparatus, e.g., a head-mounted image display apparatus, which uses a compact optical system and yet has minimal aberrations and a large exit pupil diameter. The image display apparatus has a liquid crystal display device (2), and an ocular lens (3) for projecting an image displayed by the liquid crystal display device (2) on a user's retina. A pair of first and second diffraction gratings (11) and (12) are provided in an optical path lying between the ocular lens (3) and an exit pupil (6) formed by the ocular lens (3). The first and second diffraction gratings (11) and (12) are arranged so that the angle of diffraction caused by the second diffraction grating (12) for each wavelength of the displayed image is approximately coincident with the angle of diffraction caused by the first diffraction grating (11).

14 Claims, 18 Drawing Sheets

FIG. 1
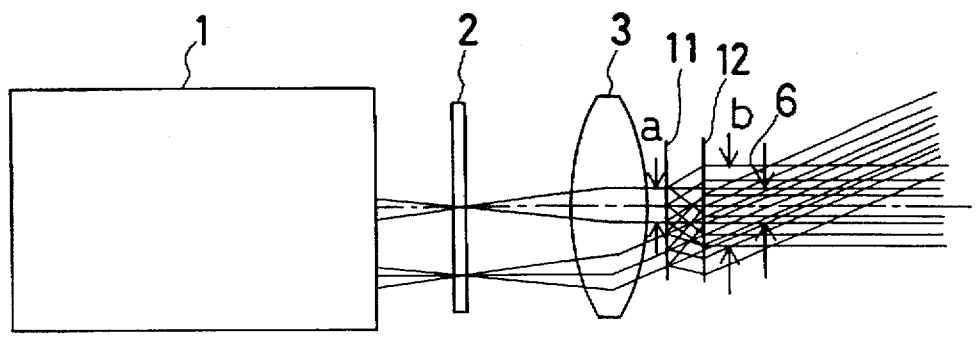
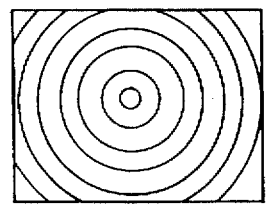
FIG. 2(a)
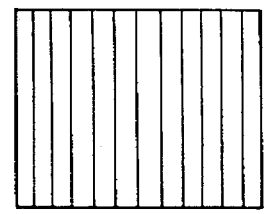
FIG. 2(c)
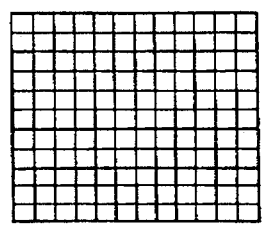
FIG. 2(b)
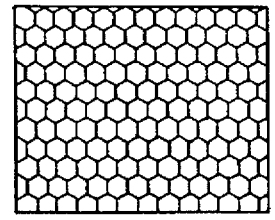
FIG. 2(d)

FIG. 3
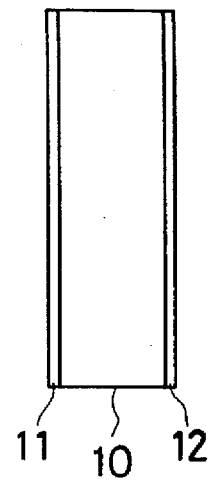
11  10  12
FIG. 4(a)    FIG. 4(b)
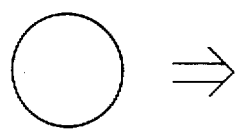 ⇒ 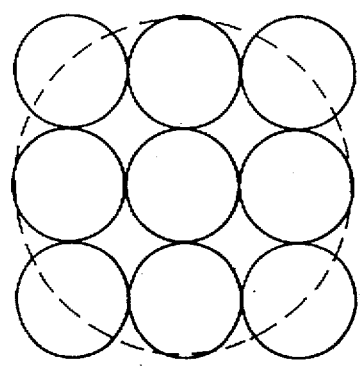
Pupil diameter of    Effective pupil
ocular lens 11 Two-dimensional rectangular diffraction grating
12 Two-dimensional rectangular diffraction grating
L 5.7 mm 11 Diffraction grating
12 Diffraction grating Unwanted diffracted light 6
13 Field selecting glass
12 Diffraction grating
11 Diffraction grating Unwanted diffracted light

IMAGE DISPLAY APPARATUS

BACKGROUND OF THE INVENTION

The present invention relates to an image display apparatus and, more particularly, to an image display apparatus, for example, a head-mounted image display apparatus, which uses a compact optical system and yet has a large exit pupil diameter.

Helmet- and goggle-type head-mounted image display apparatuses have heretofore been developed for the purpose of enabling the user to enjoy virtual reality or wide-screen images by oneself.

Conventional head-mounted image display apparatuses are generally arranged such that an image displayed on a two-dimensional display device, e.g., a liquid crystal display device, is projected on the user's retina as an enlarged image by using an ocular optical system (e.g., Japanese Patent Application Laid-Open (KOKAI) No. 4-170512). However, if the ocular optical system has a large numerical aperture, aberrations are likely to occur, and it is necessary in order to prevent occurrence of aberrations to use a complicated arrangement and a large-sized lens. To solve this problem, a head-mounted image display apparatus in which the numerical aperture is limited at the illuminating system side has been proposed (Japanese Patent Application Laid-Open (KOKAI) No. 3-214872).

However, when the numerical aperture of the ocular lens is small, it is likely that light rays will be eclipsed by the pupil of the user's eye. This problem will be explained below with reference to FIGS. 35(a) and 35(b) in the accompanying drawings. FIG. 35(a) shows an essential part of a conventional head-mounted image display apparatus. An illuminating system 1 illuminates a liquid crystal display device 2 from behind it, thereby allowing an image displayed on the liquid crystal display device 2 to be projected on the retina 5 of a user's eyeball 4 as an enlarged image by a convex lens 3 constituting an ocular optical system. To minimize aberrations produced by the convex lens 3, the illuminating system 1 illuminates the liquid crystal display device 2 with a small numerical aperture. Accordingly, the diameter of the exit pupil 6 of this head-mounted image display apparatus is small, as shown in FIG. 35(a). If the user wears the head-mounted image display apparatus such that the exit pupil 6 is precisely coincident with the position of the user's pupil 7, light rays emanating from central and peripheral images $P_1$ and $P_2$ on the liquid crystal display device 2 pass through the pupil 7, as shown in FIG. 35(a), as long as the user gazes at the center of the displayed image. Therefore, the user can observe the whole image displayed on the liquid crystal display device 2, from the center to the periphery of the displayed image. It should be noted that reference symbols $P_1'$ and $P_2'$ denote the images $P_1$ and $P_2$ projected on the retina 5.

However, when the exit pupil 6 and the position of the user's pupil 7 are not precisely coincident with each other, the light rays are eclipsed by the pupil 7, resulting in a darkened image. When the user looks at the peripheral image $P_2$, as shown in FIG. 35(b), the eyeball 4 rotates about the point of rolling, which lies in the vicinity of the center of the eyeball 4. Therefore, the position of the pupil 7 shifts, and it becomes even more difficult for the light rays emanating from the central and peripheral images $P_1$ and $P_2$ to pass through the pupil 7. In an extreme case, it becomes impossible to observe the displayed image.

SUMMARY OF THE INVENTION

In view of the above-described problems of the prior art, it is an object of the present invention to provide an image display apparatus, e.g., a head-mounted image display apparatus, which uses a compact optical system and yet has minimal aberrations and a large exit pupil diameter.

To attain the above-described object, the present invention provides an image display apparatus having a face-mounted unit and a support member for retaining the face-mounted unit on the observer's head. The face-mounted unit includes an image display device for displaying an image, an ocular optical system for forming an exit pupil by using a bundle of rays emitted from the image display device, and a diffraction device provided between the image display device and the exit pupil.

In addition, the present invention provides an image display apparatus having a device for displaying an image, and an ocular optical system for projecting the image on a user's retina. The image display apparatus further has a pair of first and second diffraction devices provided in an optical path lying between the image display device and an exit pupil formed by the ocular optical system. The first and second diffraction devices are arranged so that the angle of diffraction caused by the second diffraction device for each wavelength of the image is approximately coincident with the angle of diffraction caused by the first diffraction device.

In this case, it is preferable to arrange the image display apparatus so that the angle of diffraction caused by each of the first and second diffraction devices for the shortest wavelength of the image is larger than the field angle of the image projected by the ocular optical system.

Further, it is preferable to provide between the second diffraction device and the exit pupil a field selecting device whereby light impinging thereon at a relatively small incident angle is transmitted as it is, whereas light impinging thereon at a relatively large incident angle is scattered and thus prevented from passing therethrough.

The first and second diffraction devices may be disposed so that the respective grating directions are coincident with each other, and the respective grating surfaces are approximately parallel to each other.

The first and second diffraction devices may be plane diffraction gratings.

The first and second diffraction devices may have a grating configuration composed of a large number of grooves lined up in one direction.

The first and second diffraction devices may have a grating configuration composed of a large number of grooves lined up in two directions intersecting each other.

The first and second diffraction devices may have a surface provided with recesses and projections, which are arranged in a checkered pattern.

The first and second diffraction devices may have recesses and projections, each having a rectangular cross-sectional configuration.

The first and second diffraction devices may have a grating surface with a groove depth $d_0$ which satisfies the following condition:

$$2(n-1)d_0=\lambda$$

where n is the refractive index of the diffraction grating, and $\lambda$ is the wavelength of light from the image display device.

It should be noted that the ocular optical system may include a reflecting device, and that the reflecting device preferably has a concave surface directed toward the exit pupil.

In the present invention, a pair of first and second diffraction devices are provided in an optical path lying between an ocular optical system and an exit pupil formed by the ocular optical system, and the first and second diffraction devices are arranged so that the angle of diffraction caused by the second diffraction device for each wavelength of an image displayed on an image display device is approximately coincident with the angle of diffraction caused by the first diffraction device. Accordingly, incident light from the display surface is diffracted to separate into a plurality of light beams by the first diffraction device, and these light beams are diffracted again by the second diffraction device so as to emanate therefrom at the same angle as the angle of incidence of the light on the first diffraction device. As a result, the beam diameter of the emergent light becomes larger than that of the incident light. Thus, the exit pupil diameter is enlarged. Accordingly, it is possible to reduce the numerical aperture of light from the image display device, and it is also possible to minimize aberrations produced in the ocular optical system.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIG. 1 shows an essential part of a head-mounted image display apparatus according to a first embodiment of the present invention.

FIGS. 2(a) to 2(d) schematically show examples of diffraction gratings usable in the present invention.

FIG. 3 is a sectional view showing two diffraction gratings formed in one integral unit.

FIGS. 4(a) and 4(b) show the way in which the effective pupil diameter is enlarged by the present invention.

DESCRIPTION OF THE PREFERRED EMBODIMENTS

Figure 5:
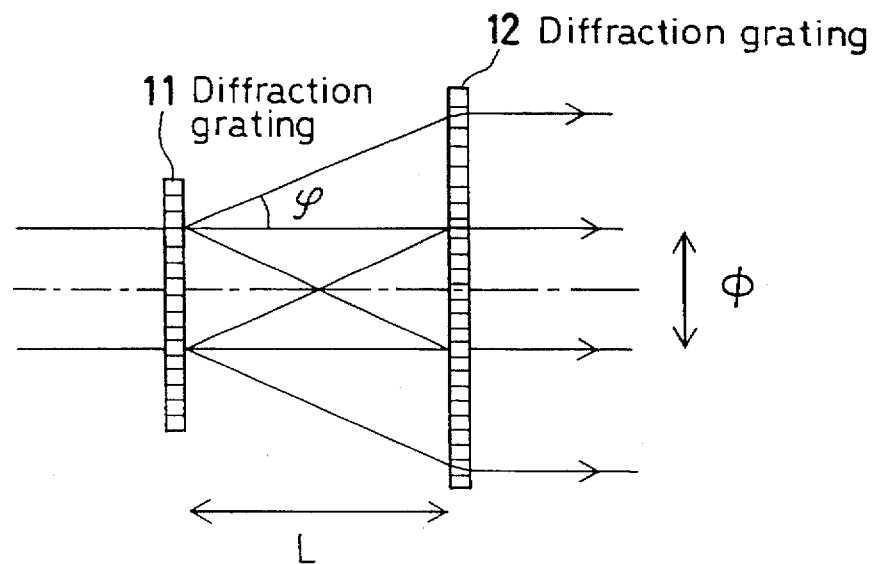
FIG. 5 shows numerical examples in an arrangement of two diffraction gratings for enlarging the pupil diameter.

The image display apparatus of the present invention will be described below by way of some embodiments and with reference to the accompanying drawings.

FIRST EMBODIMENT

FIG. 1 shows an essential part of a head-mounted image display apparatus according to the first embodiment of the present invention. In this image display apparatus, an image displayed on a liquid crystal display device 2 is projected on a user's eyeball as an enlarged image by a convex lens 3 constituting an ocular optical system. The liquid crystal display device 2 is illuminated by an illuminating system 1 disposed behind it to project the image displayed thereon. According to the present invention, a pair of diffraction gratings 11 and 12, which have the same grating interval, are disposed parallel to each other between the convex lens 3 of the ocular optical system and the exit pupil 6 thereof such that the grating directions of the diffraction gratings 11 and 12 coincide with each other.

By virtue of the above-described arrangement of the pair of diffraction gratings 11 and 12, a parallel beam of light passed through the convex lens 3 first enters the diffraction grating 11 and separates into 0th-order diffracted light, +1st-order diffracted light, and −1st-order diffracted light. These diffracted beams of light then enter the diffraction grating 12, which has the same grating interval as that of the diffraction grating 11. Thus, these beams of light are diffracted again, and a part of the light becomes a parallel beam. As a result, the beam diameter a of the light before entering the diffraction grating 11 enlarges to a beam diameter b after the light has emanated from the diffraction grating 12. Thus, the effective pupil diameter enlarges.

FIGS. 2(a) to 2(d) schematically show examples of the diffraction gratings 11 and 12 which are usable in the present invention. FIG. 2(a) shows a diffraction grating composed of ring-shaped lines; FIG. 2(b) shows a diffraction grating composed of vertically extending lines and horizontally extending lines; FIG. 2(c) shows a diffraction grating composed of lines extending either vertically or horizontally (vertically, in the case of the illustrated example); and FIG. 2(d) shows a honeycomb-shaped diffraction grating in which rows of hexagonal projections (or recesses between hexagonal patterns) are half-pitch staggered either vertically or horizontally. If the pair of diffraction gratings 11 and 12 are formed on the obverse and reverse surfaces, respectively, of a glass plate 10 as one unit, as shown for example in FIG. 3, the spacing between the surfaces of the diffraction gratings 11 and 12 can be stably maintained. It should be noted that since two diffraction gratings are used, color dispersion of the diffraction gratings 11 and 12 can be corrected by mutual compensation.

The way in which the effective pupil diameter is enlarged by using two diffraction gratings of the type that is shown in FIG. 2(b), for example, will be explained below with reference to FIGS. 4(a) and 4(b). FIG. 4(a) shows the pupil diameter when no diffraction gratings 11 and 12 are disposed, which is equal to the diameter of the exit pupil 6 of the convex lens 3. The pupil diameter is enlarged, as shown in FIG. 4(b), by disposing the diffraction gratings 11 and 12. That is, +1st-order diffracted light and −1st-order diffracted light are produced for each of the vertical and horizontal directions, causing the pupil diameter to be enlarged approximately three times. Let us examine one example of the arrangement of the diffraction gratings 11 and 12 for enlarging the pupil diameter as described above. As shown in FIG. 5, the pupil diameter Φ when no diffraction grating is provided is assumed to be Φ=4 mm, and the angle φ of diffraction at the diffraction gratings 11 and 12 is assumed to be φ=30°. To allow diffracted light beams to lie adjacently to each other without overlapping, as shown in FIG. 5, the distance L between the diffraction gratings 11 and 12 should be set at 6.9 mm from the following relationship:

$$L = \Phi/\tan \phi = 6.9 \text{ mm}$$

Figures 6A, 6B:
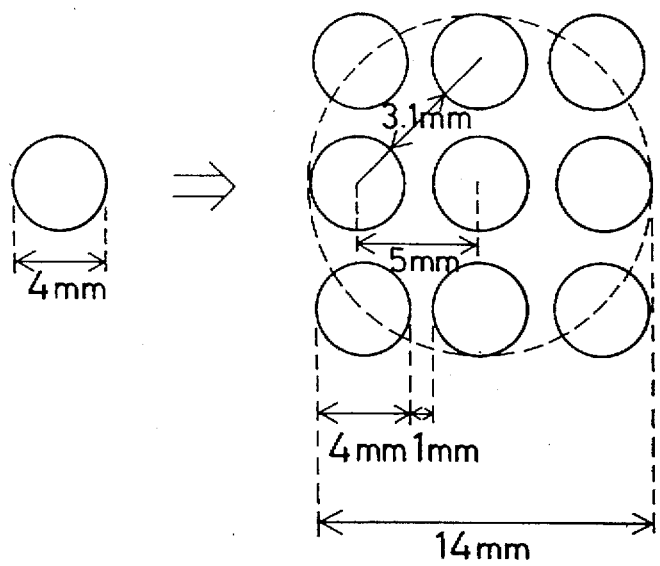
FIGS. 6(a) and 6(b) show the way in which the effective pupil diameter is enlarged by another arrangement of diffraction gratings.

In FIGS. 4(a) and 4(b), the diffraction gratings 11 and 12 are set so that diffracted light beams are in contact with each other. However, it is also possible to set the diffraction gratings 11 and 12 so that a gap is produced between diffracted light beams. FIGS. 6(a) and 6(b) are views similar to FIGS. 4(a) and 4(b), showing an example in which two diffraction gratings of the type that is shown in FIG. 2(b) are used. FIG. 6(a) shows the pupil diameter when no diffraction gratings 11 and 12 are disposed. The pupil diameter Φ is assumed to be Φ=4 mm. FIG. 6(b) shows the condition of the pupil when the diffraction gratings 11 and 12 are disposed such that a gap of 1 mm is produced between each pair of vertically and horizontally adjacent diffracted light beams. The overall beam diameter becomes 14 mm. The pupil magnifying power is 3.5 (14/4=3.5), which is larger than 3 in the case of FIGS. 4(a) and 4(b).

In this case, when the gap is excessively large, it is likely that when the pupil of the user's eyeball lies between a pair of adjacent diffracted light beams, no light beam will enter the pupil and hence no image will be visible. In the case of FIG. 6(b), the diffraction gratings 11 and 12 are set so that the gap between each pair of diagonally adjacent diffracted light beams is 3.1 mm, which is smaller than the pupil diameter 4 mm of the user when enjoying image observation with the head-mounted image display apparatus. However, there is a problem that the brightness of the image changes depending upon the position of the user's pupil.

Figure 7:
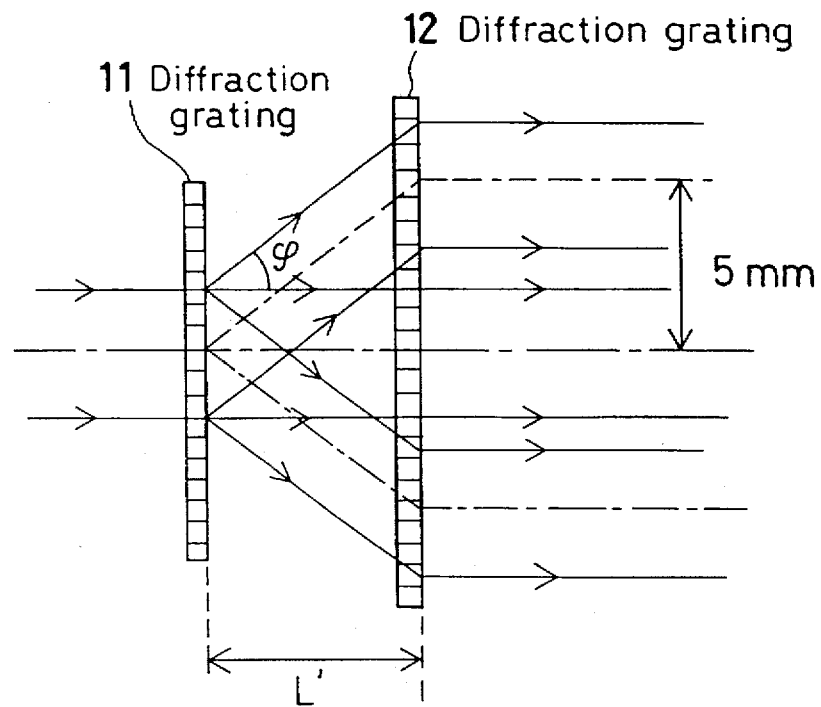
FIG. 7 shows an arrangement of two diffraction gratings in the case of FIGS. 6(a) and 6(b).

As will be understood from FIG. 7, in a case where diffracted light beams separate as shown in FIG. 6(b), the distance L' between the diffraction gratings 11 and 12 is set at 8.7 mm when the diffraction angle φ is 30° from the relationship of L'=5/tan φ.

Figure 8:
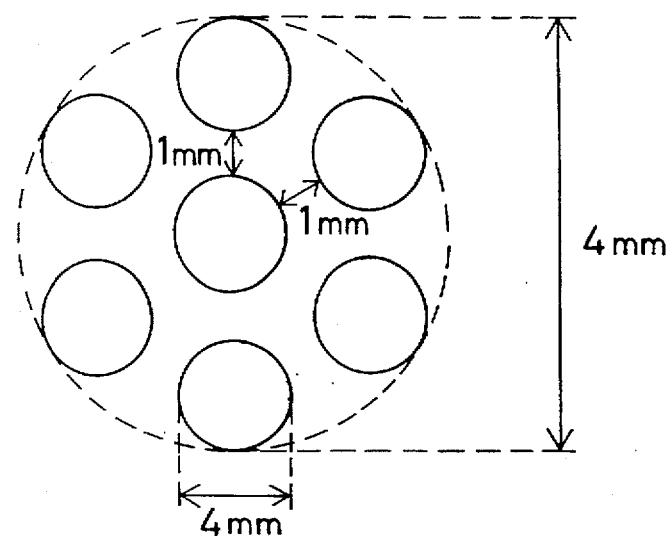
FIG. 8 shows the condition of the pupil when the diffraction gratings of the type shown in FIG. 2(d) are used.

FIG. 8 shows the condition of the pupil when the honeycomb-shaped diffraction grating shown in FIG. 2(d) is used. In this case, 1st-order diffracted light beams lie at the vertices of a hexagon centered at 0th-order diffracted light. Assuming that the pupil diameter when no diffraction grating is provided is 4 mm and the gap between each pair of adjacent diffracted light beams is 1 mm, the pupil diameter when the diffraction gratings 11 and 12 are provided is 14 mm in the same way as in the case of FIG. 6(b). However, as will become clear by comparison with FIG. 6(b), the area of the gap is smaller than that in the case of FIG. 6(b). Accordingly, even when the pupil position of the user's eyeball changes, the brightness of the image is unlikely to change in comparison to the arrangement shown in FIG. 6(b).

In the foregoing examples, a method of enlarging the pupil diameter by using 0th-order diffracted light and ±1st-order diffracted light has been described. In the following example, ±1st-order diffracted light alone is used.

Figure 9:
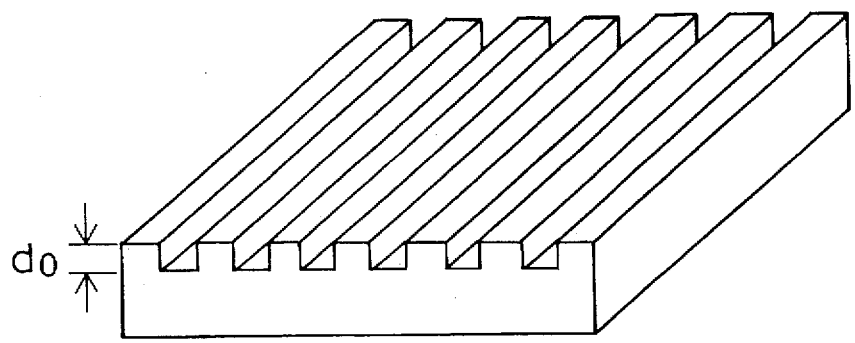
FIG. 9 is a perspective view of a rectangular diffraction grating.
Figure 10:
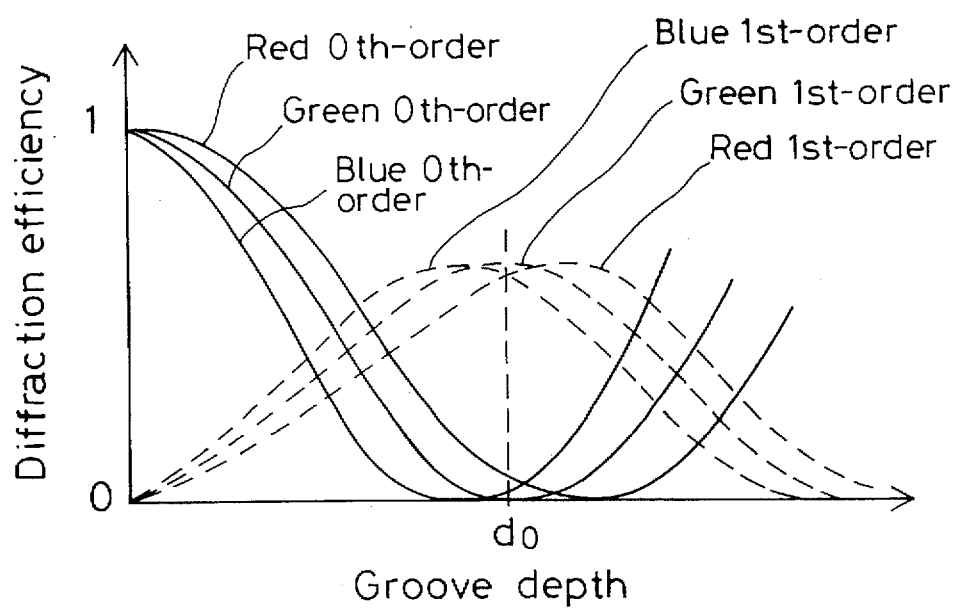
FIG. 10 is a graph showing the dependence of the diffraction efficiency of a rectangular diffraction grating on the groove depth.

The diffraction efficiency of ordinary diffraction gratings has wavelength dependence. Therefore, when a full-color image formed by using three colors, i.e., red, green and blue, is passed through an ordinary diffraction grating, there is variation in color between the central and peripheral portions of the image. To solve this problem, a rectangular diffraction grating having a duty ratio of 0.5 is used, as shown in the perspective view of FIG. 9. The dependence of the diffraction efficiency of the rectangular diffraction grating on the groove depth is shown in the graph of FIG. 10. FIG. 10 shows the diffraction efficiencies of 0th- and 1st-order diffracted light for each of red, green and blue light. As will be clear from the graph, the groove depth dependence of the diffraction efficiency differs among red, green and blue light. The rectangular diffraction grating having a duty ratio of 0.5 is characterized in that the intensity of 1st-order diffracted light reaches a maximum at a groove depth where 0th-order diffracted light disappears. If the groove depth of the rectangular diffraction grating is set in the vicinity of the peaks of the curves representing the 1-st order diffracted beams of red, green and blue light (i.e., the position $d_0$ in FIG. 9), there is substantially no difference in diffraction efficiency between the 1st-order diffracted beams of red, green and blue light, and the diffraction efficiency of 0th-order diffracted light is very small for any of the red, green and blue light. Accordingly, at such a groove depth, the colors of the image do not vary according to the pupil position of the user's eyeball. When the wavelengths of red, green and blue light are 0.62 µm, 0.55 µm and 0.40 µm, respectively, and the refractive index of the diffraction grating is 1.5, the above-described depth $d_0$ is 0.58 µm. This value satisfies the relationship of $2(n-1)d_0 \approx$ working wavelength.

Figure 11:
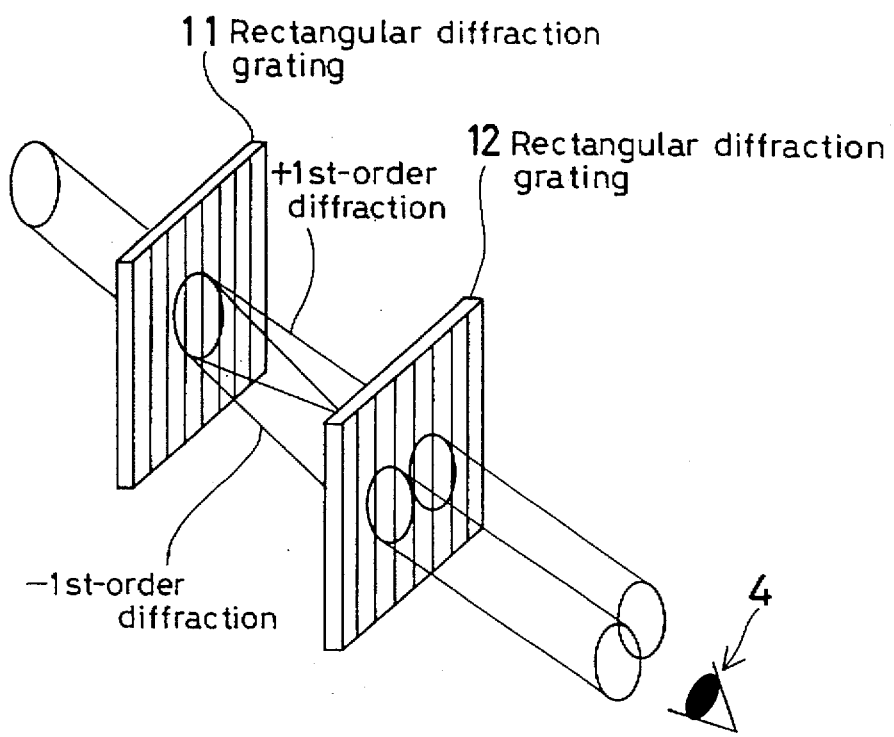
FIG. 11 shows an arrangement for enlarging the pupil diameter which uses rectangular diffraction gratings.

FIG. 11 shows a pupil diameter enlarging arrangement that uses the above-described rectangular diffraction gratings 11 and 12. Light incident on the rectangular diffraction grating 11 is diffracted to produce ±1st-order diffracted light, which then enters the rectangular diffraction grating 12. As a result, a part of the +1st-order diffracted light is diffracted to become −1st-order diffracted light, which enters the eye 4 in parallel to the incident light, while a part of the −1st-order diffracted light is diffracted to become +1st-order diffracted light, which enters the eye 4 in parallel to the incident light. Accordingly, the two diffracted light beams enter the eye 4 in parallel to each other, and thus the lateral pupil diameter is enlarged.

Figure 12:
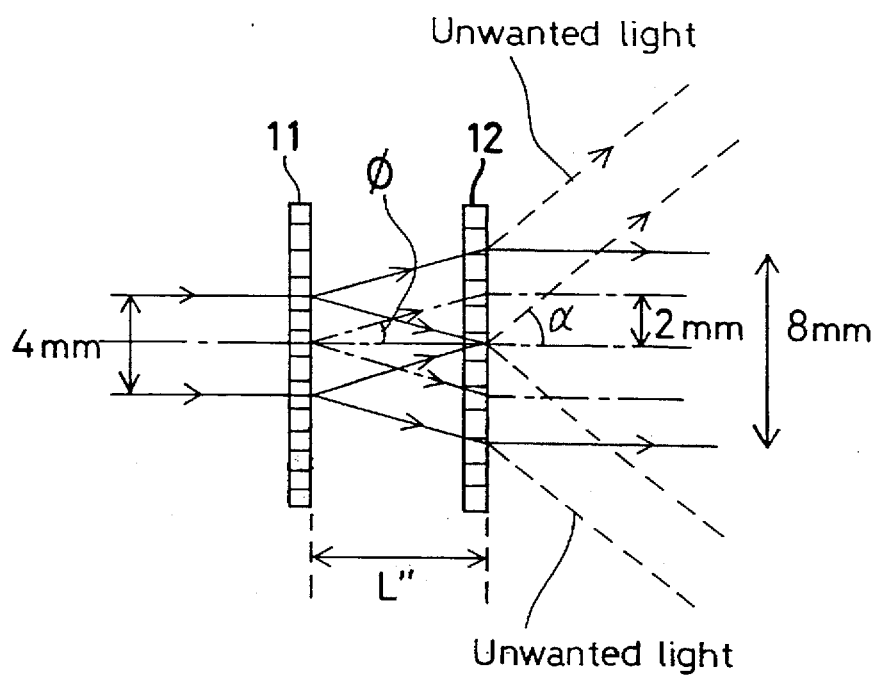
FIG. 12 shows numerical examples in an arrangement of two rectangular diffraction gratings for enlarging the pupil diameter.
Figure 22:
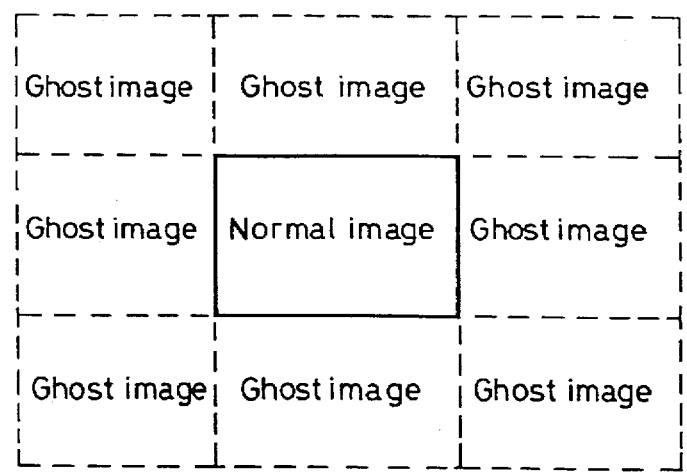
FIG. 22 shows the way in which ghost images are separated from a normal image.

FIG. 12 shows an arrangement for enlarging an incident light beam having a diameter of 4 mm to a light beam of 8 mm in diameter. In this arrangement, the rectangular diffraction gratings 11 and 12 are set so that two light beams produced by diffraction are in close contact with each other without a gap. The problem that arises from this arrangement is unwanted light, which is shown by the dotted lines in the figure. In order to prevent ghost images produced by the unwanted light from overlapping the normal image, as shown in FIG. 22 (described later), the angle α of the unwanted light must be larger than the field angle 2θ. Assuming that the field angle is 30°, it is necessary to satisfy the condition of $\alpha \geq 30°$. Since the angle α is double the diffraction angle φ, the condition of $\phi \geq 15°$ must be satisfied. Assuming that the wavelength of light is 0.4 µm, the pitch p of the diffraction gratings 11 and 12 is $p = \lambda / \sin \theta = 1.5$ µm. The pitch is double the pitch in an arrangement where 0th-order diffracted light is used (described later in connection with FIG. 22). Accordingly, the production of the diffraction gratings 11 and 12 is facilitated.

In this case, the distance L" between the two diffraction gratings 11 and 12 is as follows:

$$L" = 2 / \tan 15° = 7.5 \text{ mm}$$

Figure 13:
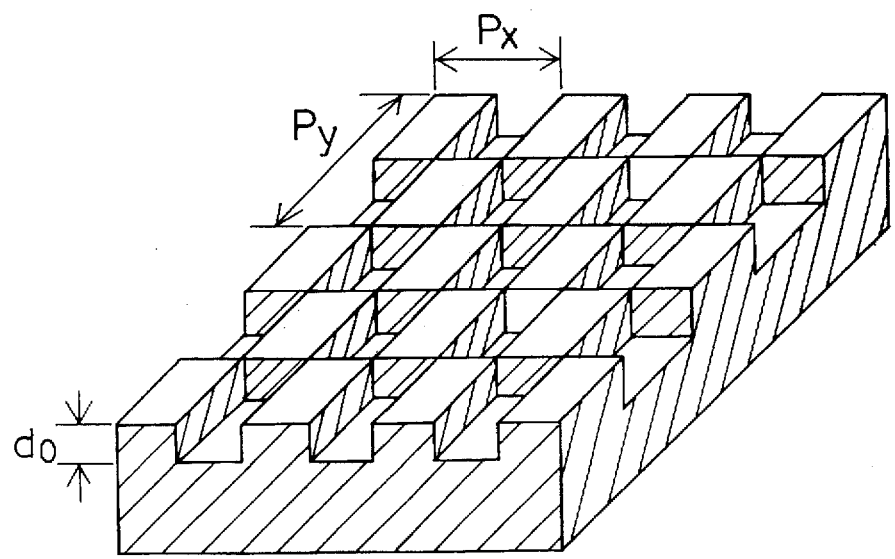
FIG. 13 is a perspective view of a two-dimensional rectangular diffraction grating.

The rectangular diffraction gratings having a duty ratio of 0.5 may be formed from two-dimensional gratings such as that shown in the perspective view of FIG. 13. The two-dimensional rectangular diffraction grating shown in FIG. 13 has a configuration in which rectangles of the same size are arranged in a checkered pattern on a plane. The breadthwise grating pitch $P_x$ and the lengthwise grating pitch $P_y$ do not necessarily need to be equal to each other. If the groove depth $d_0$ is set in the vicinity of 0.5 µm, no 0th-order diffracted light is produced for light of three colors, i.e., red, green and blue, in the same way as in the case of the one-dimensional diffraction grating shown in FIG. 9.

Figure 14:
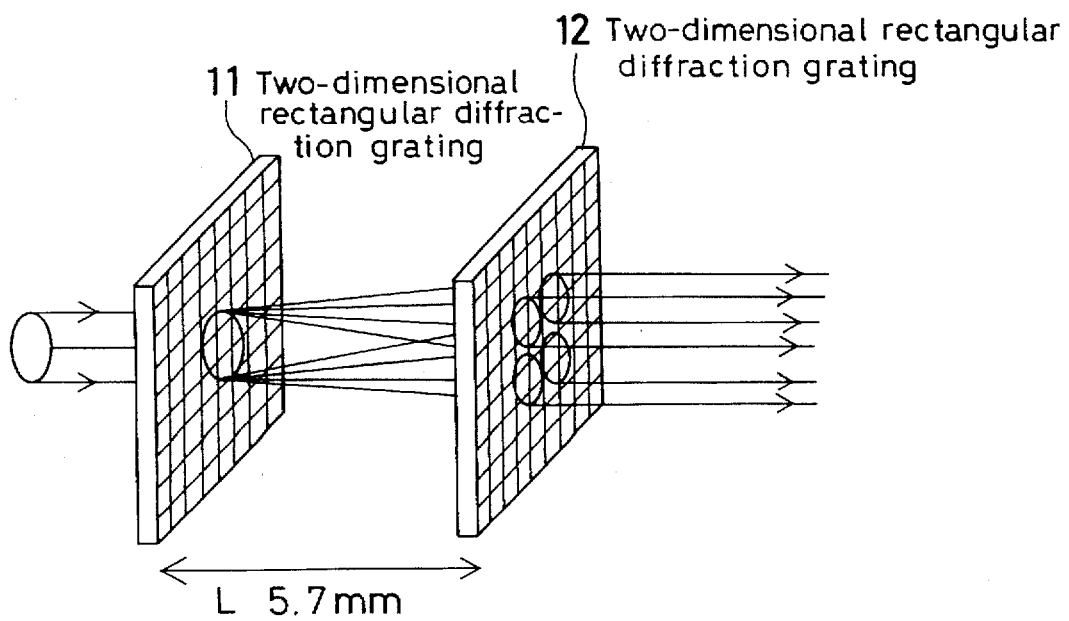
FIG. 14 shows an arrangement for enlarging the pupil diameter which uses two-dimensional rectangular diffraction gratings.
Figure 15:
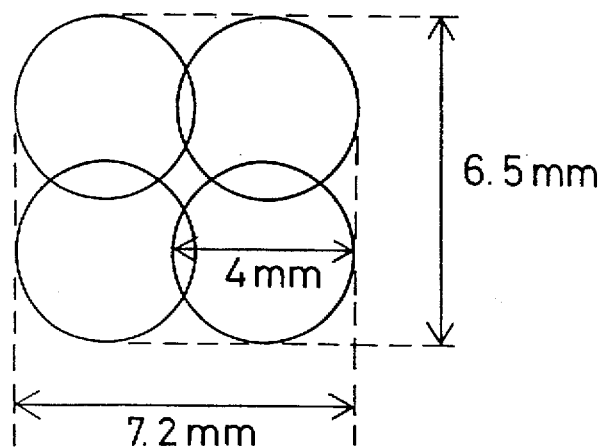
FIG. 15 shows the condition of the pupil when two-dimensional rectangular diffraction gratings are used.

If two two-dimensional rectangular diffraction gratings 11 and 12 of the type described above are arranged in parallel to each other, as shown in FIG. 14, four parallel diffracted light beams can be obtained. When the breadthwise and lengthwise pitches $P_x$ and $P_y$ are 2 µm and 2.5 um, respectively, and the distance L between the surfaces of the two gratings 11 and 12 is 5.7 mm, an exit pupil such as that shown in FIG. 15 is obtained. This exit pupil is sufficiently large to avoid occurrence of an eclipse even when the user looks at a peripheral portion of an image incident on his/her eye at a view angle of 45°.

Figure 16:
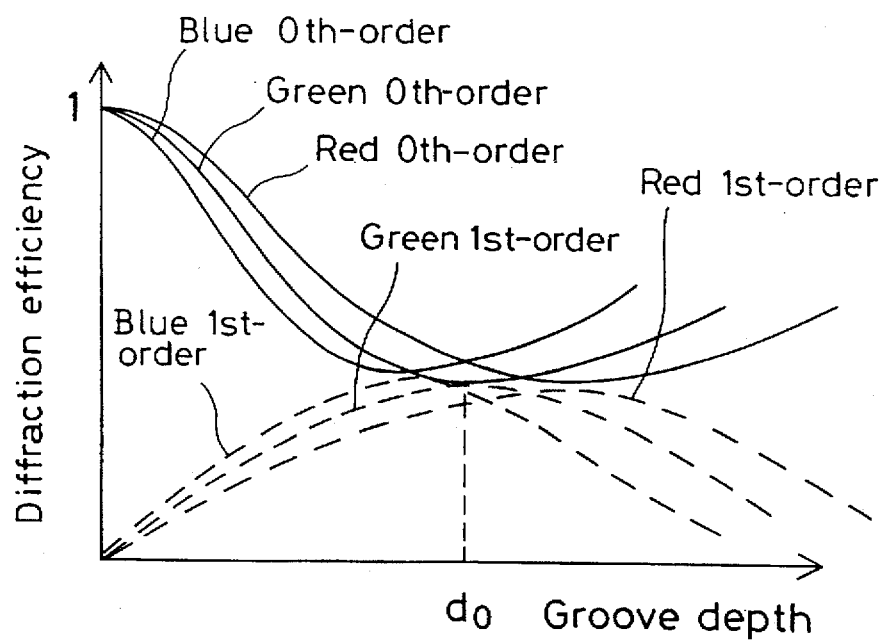
FIG. 16 is a graph showing the groove depth dependence of the diffraction efficiency of a rectangular diffraction grating having a duty ratio of 0.265.

In the foregoing, we have discussed a method wherein rectangular diffraction gratings having a duty ratio of 0.5 are used to minimize the wavelength dependence of the diffraction efficiency. The same purpose may be attained by another method in which rectangular diffraction gratings having a duty ratio of about 0.25 are used. In this case, 0th-order diffracted light is also used. FIG. 16 shows the dependence of the diffraction efficiency on the groove depth when the duty ratio is 0.265. In the case of a rectangular diffraction grating having a duty ratio of 0.265, the trough of the 0th-order diffraction efficiency curve and the peak of the 1st-order diffraction efficiency curve coincide with each other. The groove depth at which the coincidence occurs depends on the wavelength. However, since the 0th-order and 1st-order diffraction efficiency curves come in contact with each other at a gentle slope, the diffraction efficiency only slightly varies with the wavelength. When the groove depth $d_0$ is 0.58 µm, the wavelength dependence reaches a minimum. Such a rectangular diffraction grating may be formed in either a one-dimensional configuration as shown in FIG. 9 or a two-dimensional configuration as shown in FIG. 13. With this method, nine diffracted light beams can be used. Therefore, the pupil magnifying power is large, and an image of minimal color shading can be provided.

Figure 17:
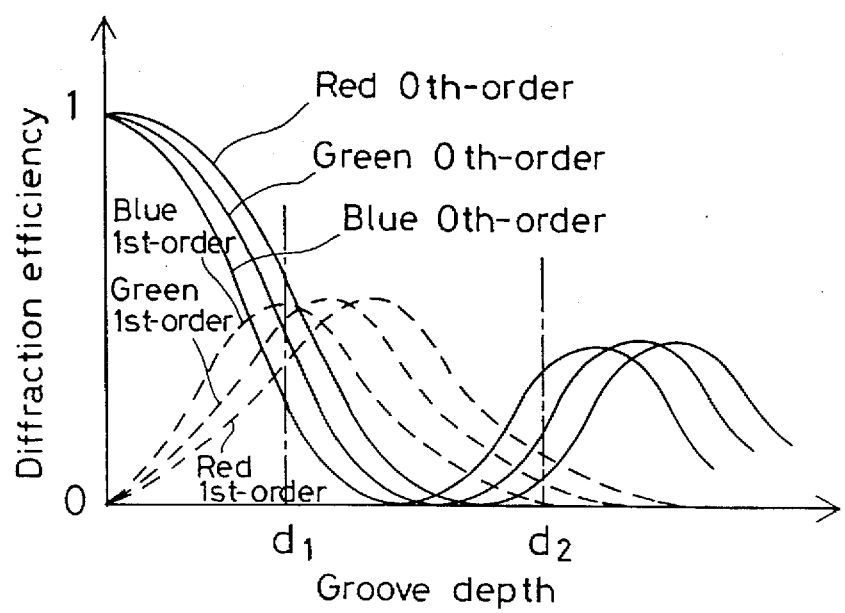
FIG. 17 is a graph showing the groove depth dependence of the diffraction efficiency of a sinusoidal diffraction grating.

Next, a method wherein color variation is prevented by using sinusoidal diffraction gratings will be explained. In this example, diffraction gratings 11 and 12 having different groove depths are used. FIG. 17 shows the relationship between the diffraction efficiency and groove depth of a sinusoidal diffraction grating. Groove depths $d_1$ and $d_2$ in the figure are selected for the two diffraction gratings 11 and 12. The magnitude of diffracted light produced by each diffraction grating is shown in the table below:

|  |  | Diffraction grating with groove depth $d_1$ | Diffraction grating with groove depth $d_2$ |
|---|---|---|---|
| Red | 0th-order | large | small |
|  | 1st-order | small | large |
| Green | 0th-order | medium | medium |
|  | 1st-order | medium | medium |
| Blue | 0th-order | small | large |
|  | 1st-order | large | small |

If a sinusoidal diffraction grating having groove depth $d_1$ is used as the diffraction grating 11 and a sinusoidal diffraction grating having groove depth $d_2$ as the diffraction grating 12 in the arrangement shown in FIG. 5, the product of the diffraction efficiency of the grating having groove depth $d_1$ and that of the grating having groove depth $d_2$ is the final diffraction efficiency. In this case, the variation in diffraction efficiency according to colors can be corrected by the two diffraction gratings 11 and 12, as will be understood from the above table.

Figure 18:
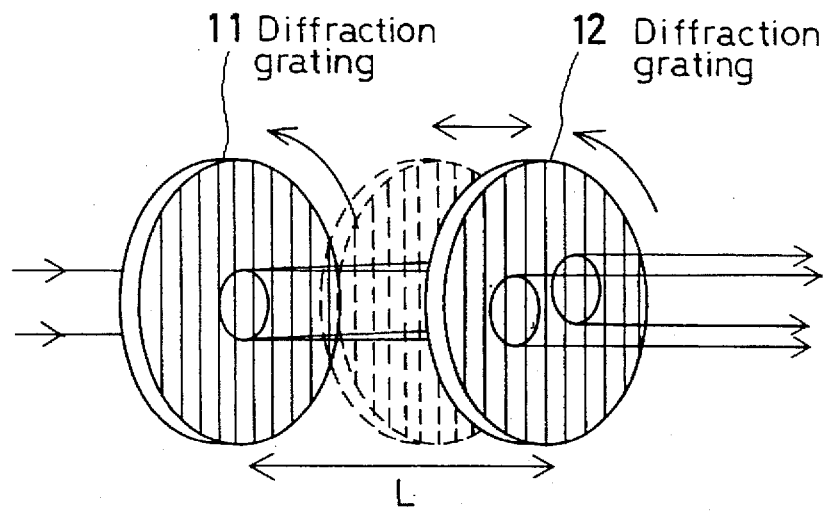
FIG. 18 shows an arrangement for enlarging the pupil diameter by rotating diffraction gratings and varying the distance between the gratings.
Figure 19:
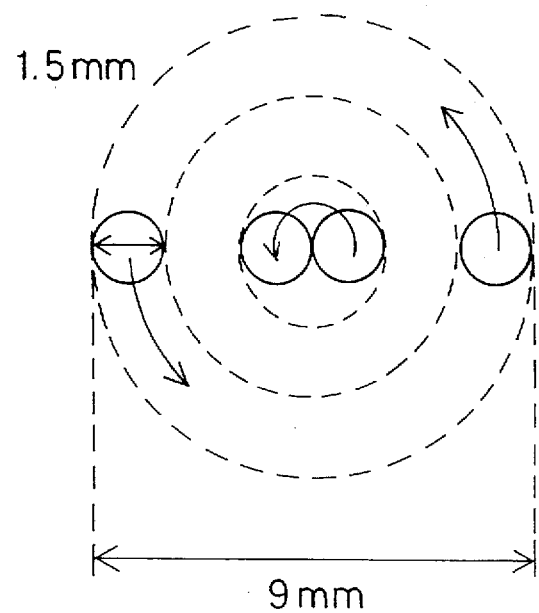
FIG. 19 shows the condition of the pupil in the case of FIG. 18.

Incidentally, in this embodiment the pupil magnifying power can be increased by simultaneously rotating the two diffraction gratings 11 and 12 and varying the distance L between the diffraction gratings 11 and 12, as shown by the arrows in FIG. 18. As the diffraction gratings 11 and 12, one-dimensional diffraction gratings which produce no 0th-order diffracted light, such as that shown in FIG. 9, are used. When the two diffraction gratings 11 and 12 are rotated, ring-shaped pupils are formed. The diameter of each ring-shaped pupil is determined by the distance L between the two diffraction gratings 11 and 12. Accordingly, by varying the distance L between the two diffraction gratings 11 and 12 while rotating them, the ring-shaped pupils overlap each other, resulting in a large pupil. For example, a pupil diameter of 1.5 mm can be enlarged to 9 mm, as shown in FIG. 19.

Figure 20A:
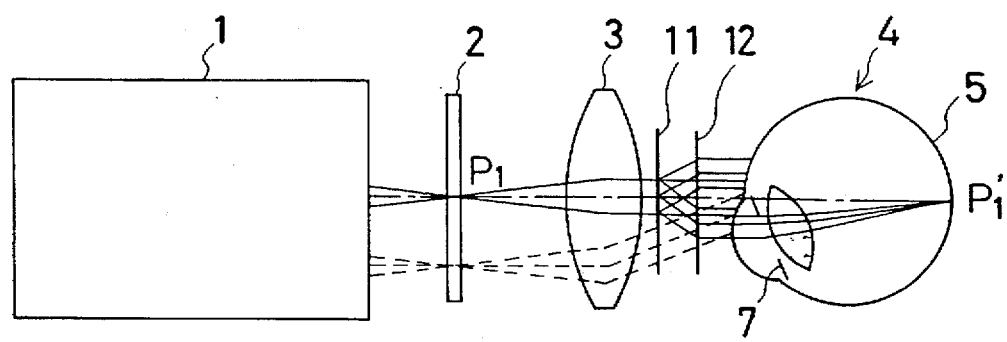
FIGS. 20(a) and 20(b) show the way in which central and peripheral images can be clearly observed by enlarging the pupil diameter.
Figure 20B:
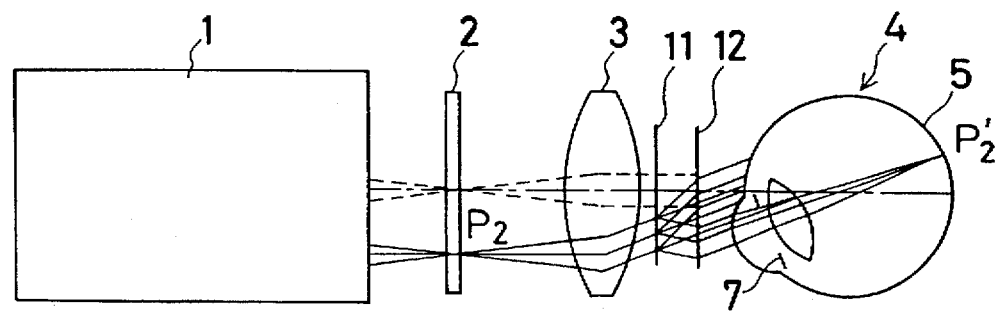

As a result of the enlargement of the pupil diameter achieved by any of the above-described arrangements, even when the user rotates his/her eyeball 4, as shown in FIGS. 20(a) and 20(b), a part of the light beam from the central image $P_1$ and a part of the light beam from the peripheral image $P_2$ pass through the pupil 7. Therefore, neither of the central and peripheral images $P_1$ and $P_2$ is eclipsed, and both the images can be clearly observed.

Figure 21A:
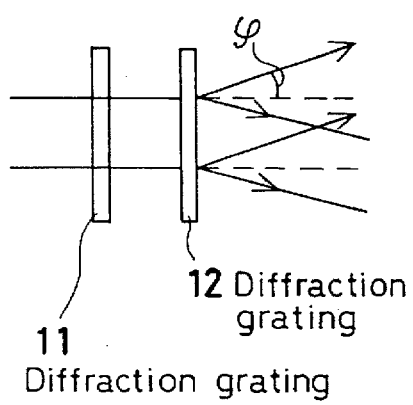
FIGS. 21(a) and 21(b) are views for explanation of occurrence of ghost images.
Figure 21B:
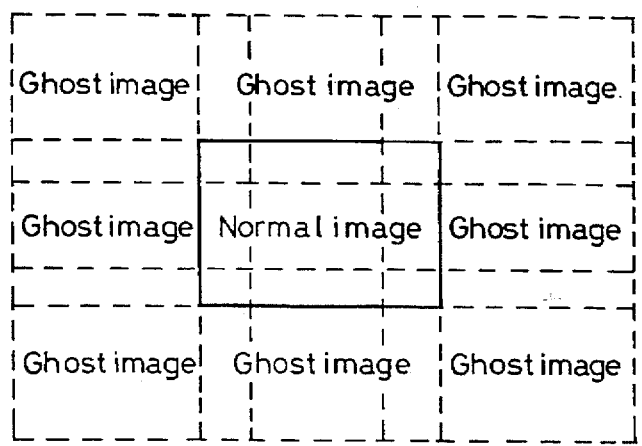

Next, a method of processing ghost images produced by unwanted diffracted light will be explained. In a case where two diffraction gratings 11 and 12 in the arrangement shown in FIG. 5 are used, for example, light that passes through either of the two diffraction gratings 11 and 12 and is diffracted by the other is unwanted light, which produces a ghost image. FIG. 21(a) shows one example of the occurrence of ghost images. In the illustrated example, ghost images are produced by light that passes through the first diffraction grating 11 and is diffracted by the second diffraction grating 12. If the diffraction angle φ is smaller than the field angle 2θ, ghost images overlap the normal image on the user's eye 4, as shown in FIG. 21(b), causing the image quality to be degraded. To prevent this problem, the diffraction angle φ should be made larger than the field angle 2θ. For example, when the field angle 2θ is 30° and the light wavelength λ is 0.4 μm, the pitch p of the diffraction gratings 11 and 12 is determined from the relationship of p·sin φ=λ as follows:

$$p < \lambda/\sin 30° = 0.8 \text{ μm}$$

Thus, it will be understood that the pitch of the diffraction gratings 11 and 12 should be less than 0.8 μm. It should be noted that in the above wavelength setting, a short wavelength, which has a small angle of diffraction, is selected from among visible light. By setting the pitch p of the diffraction gratings 11 and 12 as described above, the ghost images can be separated from the normal image, as shown in FIG. 22.

Figure 23:
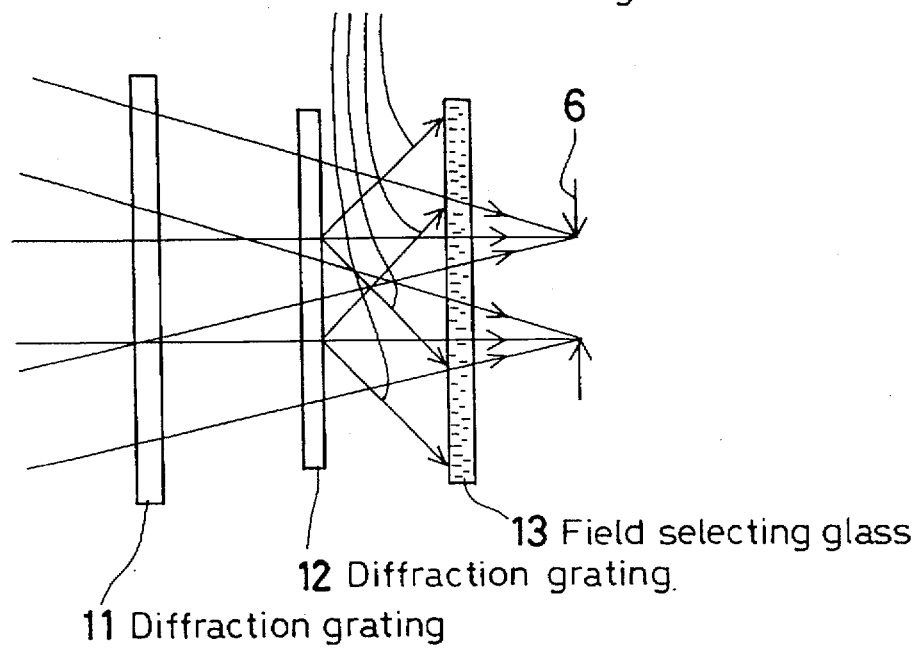
FIG. 23 is a fragmentary sectional view showing an arrangement for eliminating ghost images.

Incidentally, to completely eliminate ghost images present around the normal image as shown in FIG. 22, a field selecting glass 13 should be disposed at the exit side of the second diffraction grating 12, as shown in FIG. 23, for example. The field selecting glass 13 is a special glass whereby light impinging thereon at a relatively small incident angle is transmitted as it is, whereas light impinging thereon at a relatively large incident angle is scattered and thus prevented from passing therethrough, as in the case of "Angle 21" (trade name), manufactured by Nippon Sheet Glass Co., Ltd. If the special glass 13 is disposed between the diffraction grating 12 and the user's eye 4 and the diffraction angle φ of the diffraction gratings 11 and 12 is set so as to be larger than the field angle 2θ, unwanted light that produces ghost images is incident on the field selecting glass 13 at a larger angle than the incident angle of light that produces a normal image. Accordingly, only the unwanted diffracted light can be scattered by the field selecting glass 13. Thus, ghost images can be completely eliminated.

Figure 24:
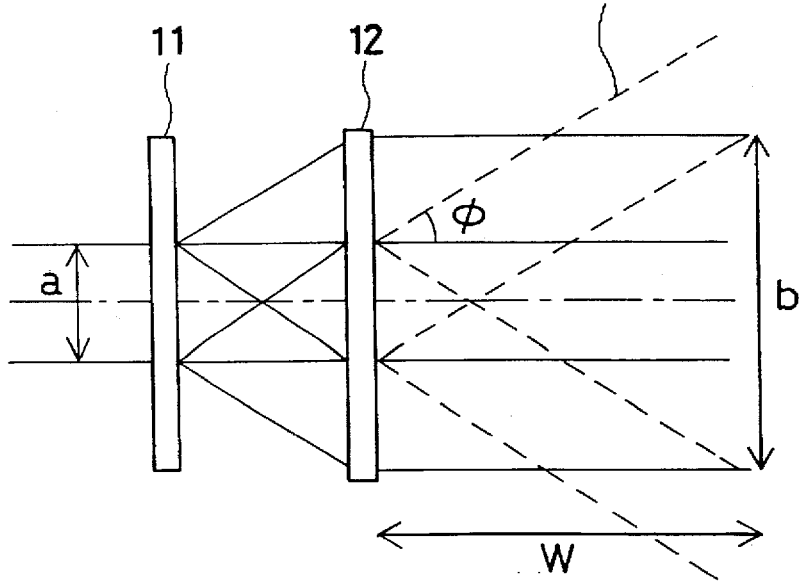
FIG. 24 is a fragmentary sectional view showing another arrangement for eliminating ghost images.

Ghost images can also be eliminated by another method wherein the distance from the diffraction grating 12 to the pupil surface of the user's eye is lengthened. That is, as shown in FIG. 24, the distance W from the diffraction grating 12 to the pupil surface of the user's eye is set so that unwanted diffracted light shown by the broken lines will not enter the area defined by the enlarged pupil diameter b. Assuming that the diffraction angle is φ and the pupil diameter before it is enlarged is a, W should be set so as to satisfy the following condition:

$$W \geq (b+a/2)/\tan \phi$$

With this method, the diffraction angle φ need not be made larger than the field angle 2θ. Therefore, it is possible to use diffraction gratings 11 and 12 having a relatively coarse diffraction grating pitch; this is an advantage of the above-described method.

SECOND EMBODIMENT

Figure 25:
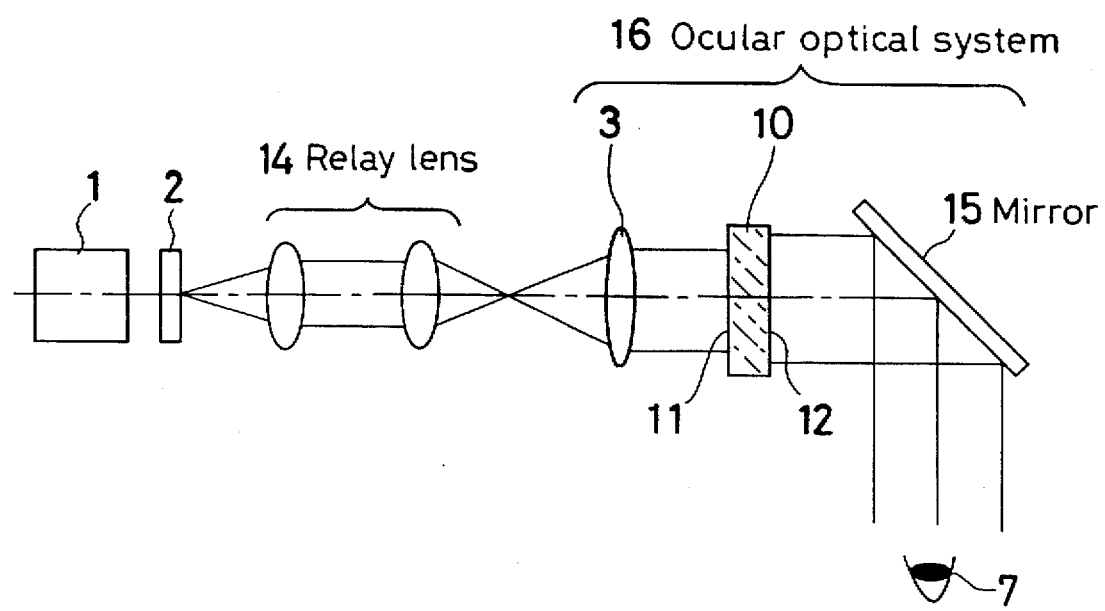
FIG. 25 is a fragmentary sectional view showing a second embodiment of the present invention.

FIG. 25 shows an essential part of a second embodiment in which the present invention is applied to a head-mounted image display apparatus which is composed of a relay optical system and an ocular optical system. Referring to FIG. 25, a relay lens 14 is disposed between the liquid crystal display device 2 and the ocular lens 3, and an ocular optical system 16 is composed of the ocular lens 3 and a mirror 15. According to the present invention, a pair of diffraction gratings 11 and 12 which are integrated into one unit as shown in FIG. 3, for example, is interposed between the ocular lens 3 and the mirror 15 in the ocular optical system 16. With this arrangement, the numerical aperture of light from the liquid crystal display device 2 can be reduced, and aberrations produced by the ocular lens 3 can be minimized. In addition, the diameter of the relay lens 14 can be reduced. Thus, the above-described arrangement is also advantageous from the viewpoint of achieving a reduction in the weight.

Figure 26:
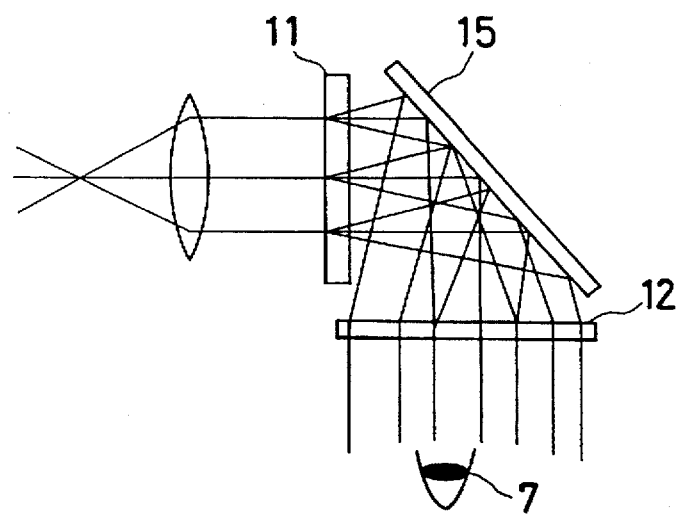
FIG. 26 is a fragmentary sectional view showing a modification of the second embodiment.

It is also possible to dispose a pair of diffraction gratings 11 and 12 at respective positions adjacent to the mirror 15, as shown in FIG. 26, so that light passes through the diffraction grating 11 before being reflected by the mirror 15, and the reflected light passes through the diffraction grating 12. With this arrangement, the optical path length from the first diffraction grating 11 to the second diffraction grating 12 can be increased by a turn of the optical path made at the mirror 15. Accordingly, the pupil diameter can be further enlarged.

THIRD EMBODIMENT

Figure 27:
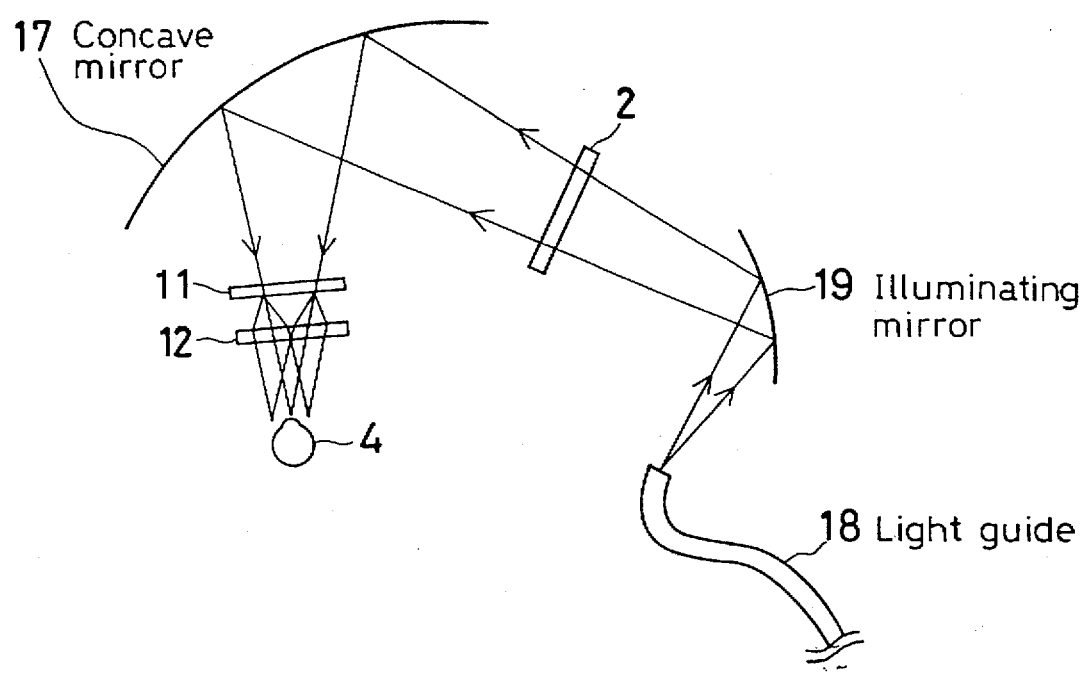
FIG. 27 is a fragmentary sectional view showing a third embodiment of the present invention.

In this embodiment, the present invention is applied to a head-mounted image display apparatus in which, as shown in FIG. 27, a concave mirror 17 serving as an ocular optical system is disposed in front of the user's eye 4. Since the present invention enables the pupil diameter to be enlarged, it is possible to reduce the numerical aperture of a light source that illuminates the liquid crystal display device 2. Therefore, in this embodiment a light guide 18 is used as a point source of light, and illuminating light from the light guide 18 is reflected by an illuminating mirror 19 so as to enter the liquid crystal display device 2 from behind it. Light passed through the liquid crystal display device 2 is reflected by the concave mirror 17 and then passes through the two diffraction gratings 11 and 12, which are disposed between the concave mirror 17 and the user's eye 4, to enter the eye 4. Each of the optical elements is disposed so that a real image of the light guide 18 lies on the pupil surface of the user's eyeball. The use of such a point source of light minimizes the necessity of making aberration correction at the concave mirror 17.

Figure 28:
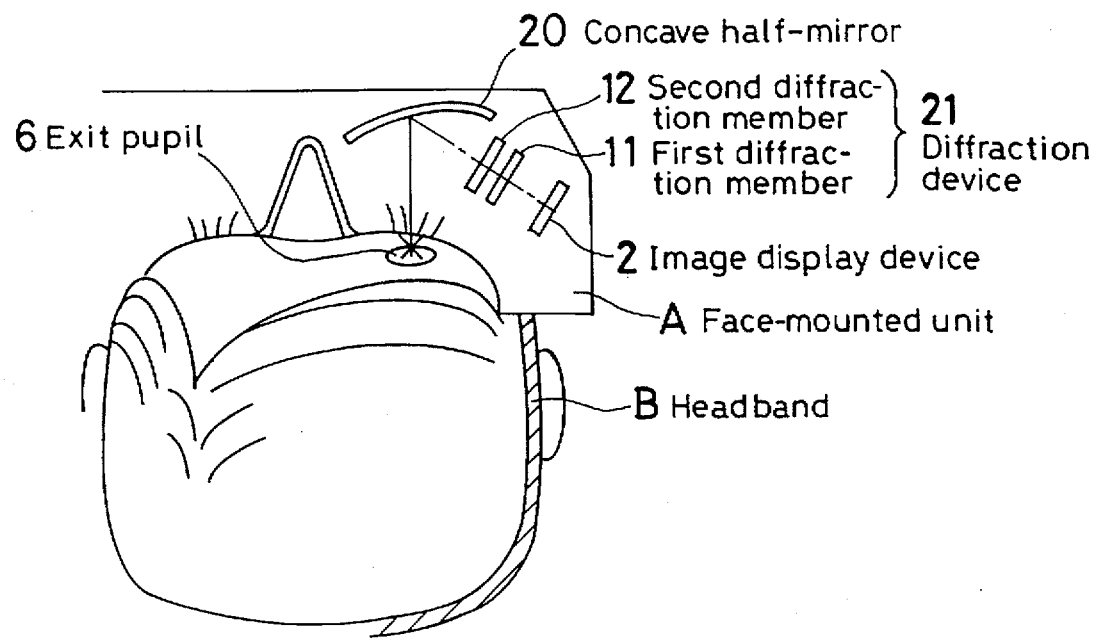
FIG. 28 shows an optical arrangement of one example in which an optical system according the present invention is provided in a face-mounted unit.

FIG. 28 shows the optical arrangement of one example in which the optical system of the present invention is provided in a face-mounted unit A. In this case, the liquid crystal display device 2 is provided in the vicinity of each of the observer's left and right temporal regions, and an image displayed on the liquid crystal display device 2 is led to an observer's eyeball as an aerial enlarged image by a concave half-mirror 20 disposed in front of each of the observer's left and right eyeballs. In this case, a diffraction device 21 (including a first diffraction member 11 and a second diffraction member 12) is provided between the concave half-mirror 20 and the liquid crystal display device 2.

Figure 29:
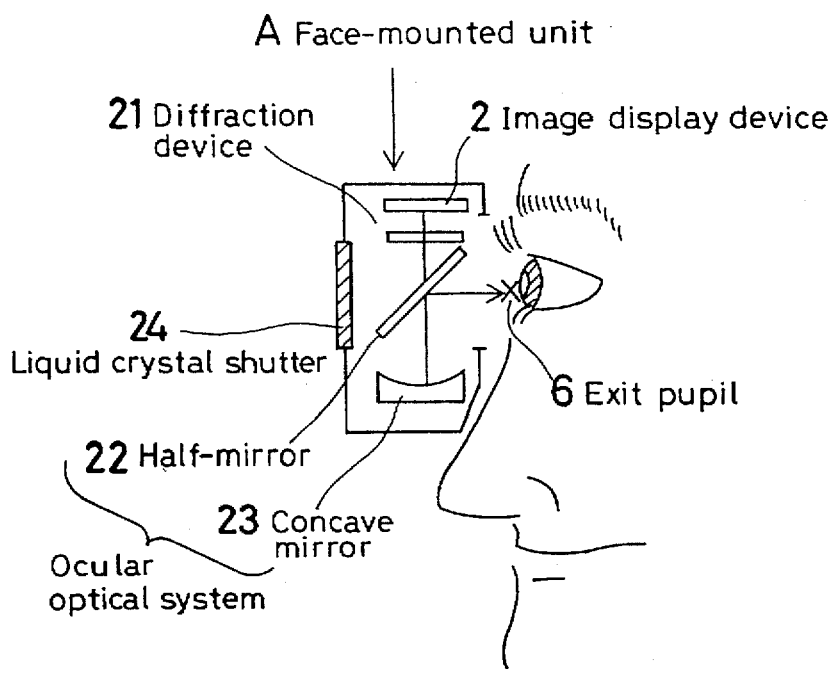
FIG. 29 shows an optical arrangement of one example in which another optical system according to the present invention is provided in a face-mounted unit.

The optical arrangement of the face-mounted unit A may be such as that shown in FIG. 29. In the illustrated type of face-mounted unit, light from the liquid crystal display device 2 is reflected by a concave mirror 23 which is disposed to face the liquid crystal display device 2 across a half-mirror 22, and the reflected light is then reflected by the half-mirror 22 toward the observer's eyeball to form an exit pupil 6. An image displayed on the liquid crystal display device 2 is projected in the air for the observer as an enlarged virtual image by an ocular optical system which is composed of the half-mirror 22 and the concave mirror 23. In addition, a liquid crystal shutter 24 is provided so that the optical axis of the shutter 24 intersects an optical axis connecting the liquid crystal display device 2 and the concave mirror 23 and the liquid crystal shutter 24 faces the exit pupil 6 across the half-mirror 22. By opening the liquid crystal shutter 24, an outside world image can also be observed.

Figure 30:
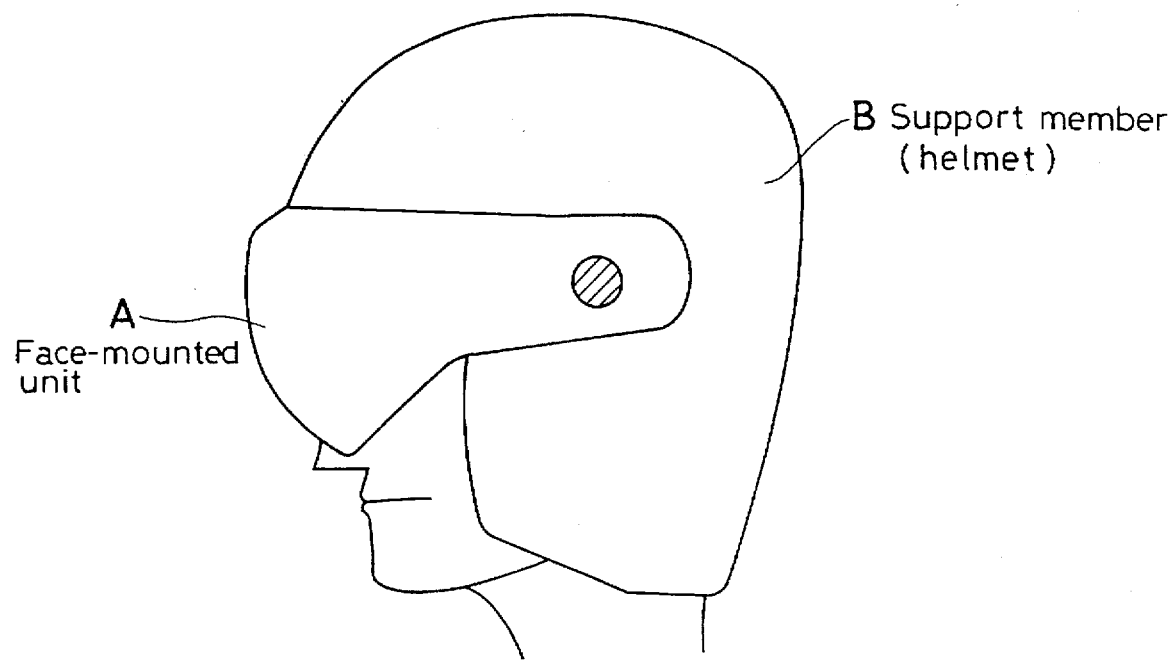
FIG. 30 shows one example of a support member used in the present invention.
Figure 31:
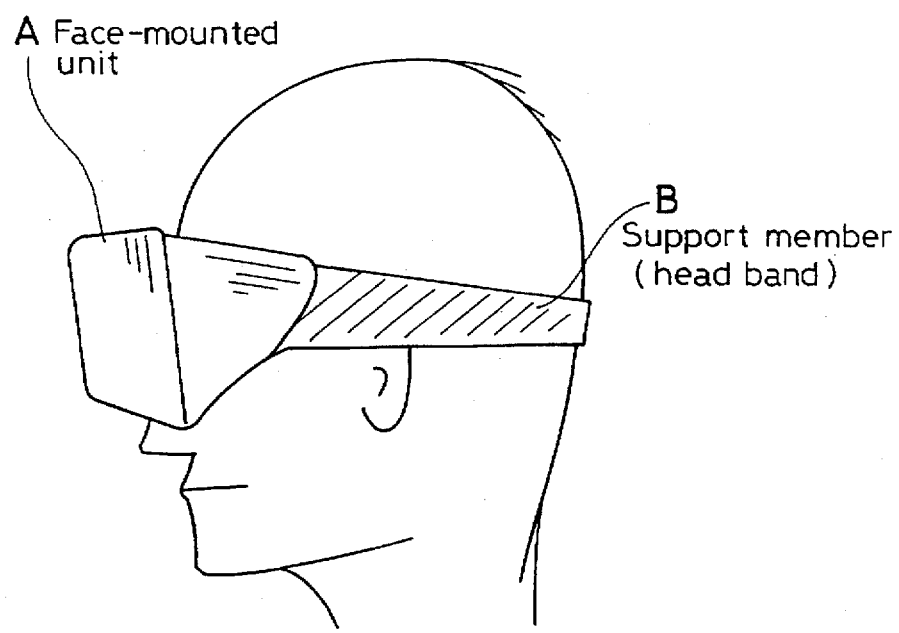
FIG. 31 shows another example of the support member.

Next, a support member B for the face-mounted unit A of the type described in the above examples will be explained with reference to FIGS. 30 and 31. FIG. 30 shows an example in which a helmet is used as a support member B to retain the face-mounted unit A on the user's head. FIG. 31 shows an example in which a headband is used as a support member B to retain the face-mounted unit A on the user's head. It should be noted that the headband is not necessarily limited to those made of rubber but may be a belt-like support member or a support member which is designed to clamp the user's head.

Figure 32:
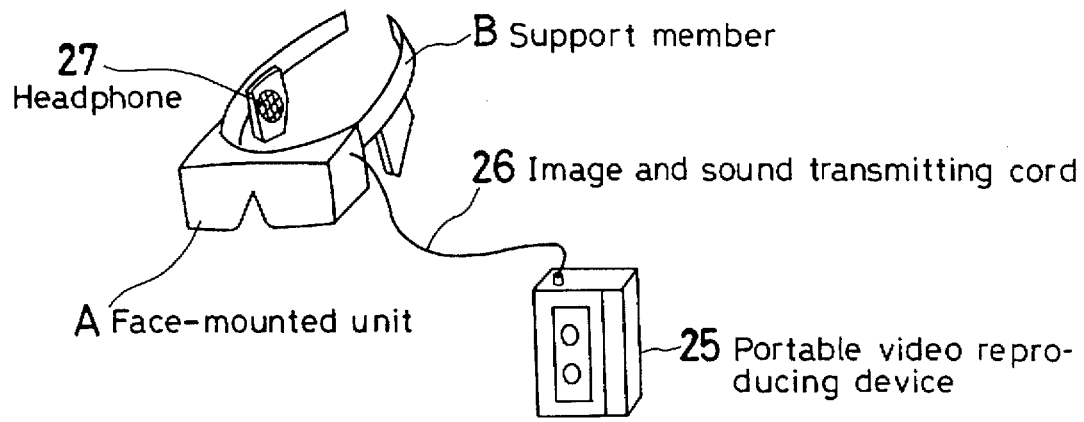
FIG. 32 shows one example of equipment which may be attached to the image display apparatus of the present invention.

Various equipment may be attached to the image display apparatus of the present invention, arranged as described above. For example, as shown in FIG. 32, a portable video reproducing device 25 may be connected to the image display apparatus through an image and sound transmitting cord 26, thereby transmitting images and sound to the face-mounted unit A. The observer can hear the sound with a small-sized speaker (headphone) 27 that is connected to the support member B. The support member B is provided in such a manner as to clamp the observer's temporal regions.

Figure 33:
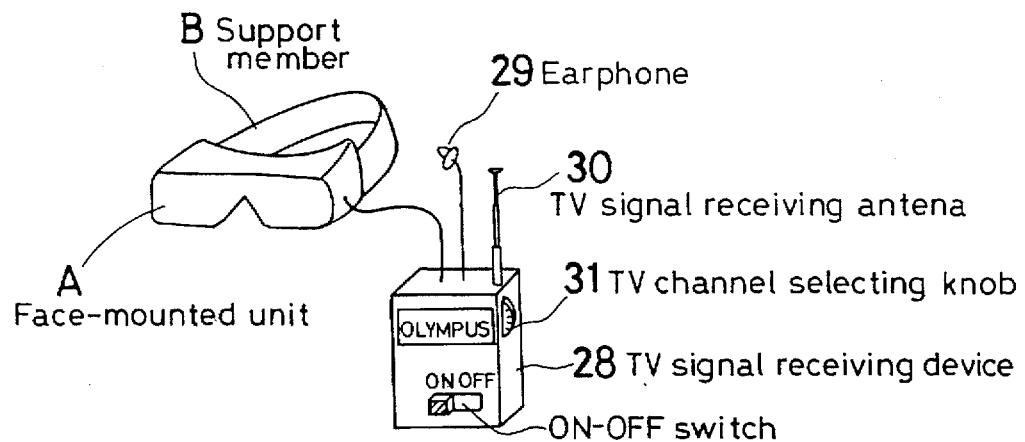
FIG. 33 shows another example of equipment which may be attached to the image display apparatus of the present invention.

As shown in FIG. 33, the image display apparatus of the present invention may also be connected to a TV signal receiving device 28 having a TV signal receiving antenna 30, a TV channel selecting knob 31, etc. In this system, a TV signal is received by the TV signal receiving device 28, and the received image is displayed by the face-mounted unit A, while the sound is sent to an observer's ear by an earphone 29 that is connected to the TV signal receiving device 28.

Figure 34:
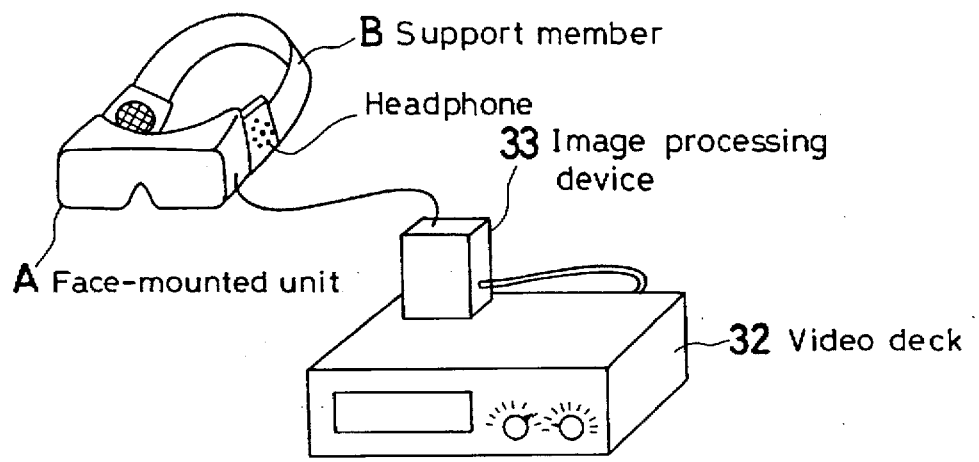
FIG. 34 shows still another example of equipment which may be attached to the image display apparatus of the present invention.
Figure 35A:
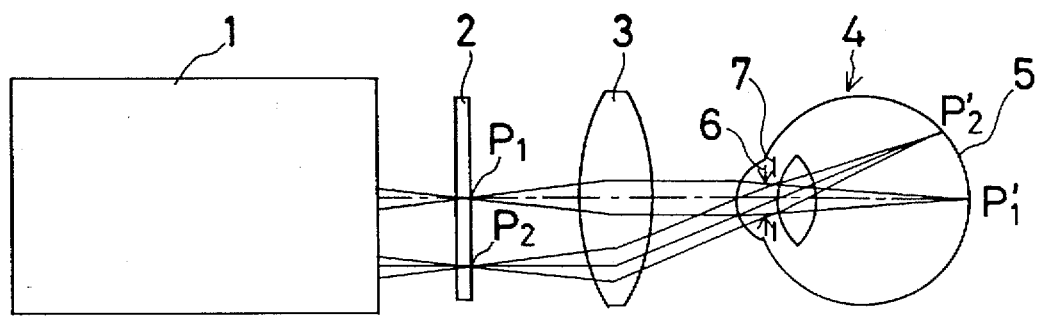
FIGS. 35(a) and 35(b) are views for explanation of problems arising when the numerical aperture of an ocular lens is small.
Figure 35B:
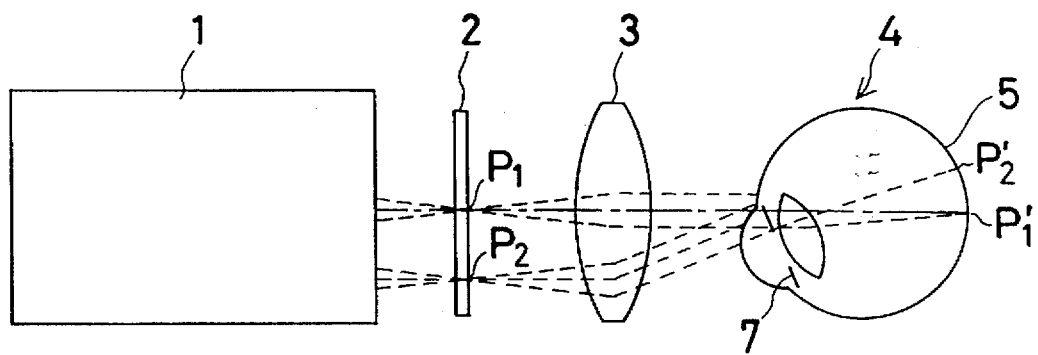

As shown in FIG. 34, the image display apparatus of the present invention may also be connected to an existing video deck 32 or TV through an image processing device 33, thereby sending images to the face-mounted unit A and sound to a headphone that is integrally provided on the support member B.

Although the image display apparatus of the present invention has been described above by way of some embodiments, it should be noted that the present invention is not necessarily limited to these embodiments, and that various changes and modifications may be imparted thereto.

As will be clear from the foregoing description, in the image display apparatus of the present invention, a pair of first and second diffraction devices are provided in an optical path lying between an ocular optical system and an exit pupil formed by the ocular optical system, and the first and second diffraction devices are arranged so that the angle of diffraction caused by the second diffraction device for each wavelength of an image displayed on an image display device is approximately coincident with the angle of diffraction caused by the first diffraction device. Accordingly, incident light from the display surface is diffracted to separate into a plurality of light beams by the first diffraction device, and these light beams are diffracted again by the second diffraction device so as to emanate therefrom at the same angle as the angle of incidence of the light on the first diffraction device. As a result, the beam diameter of the emergent light becomes larger than that of the incident light. Thus, the exit pupil diameter is enlarged. Accordingly, it is possible to reduce the numerical aperture of light from the image display device, and it is also possible to minimize aberrations produced in the ocular optical system.

What we claim is:

1. An image display apparatus comprising:

a face-mounted unit including an image display device for displaying an image, an ocular optical system for forming an exit pupil by using a bundle of rays emitted from said image display device, and diffraction means provided between said image display device and said exit pupil; and support means for retaining said face-mounted unit on an observer's head, wherein said diffraction means enlarges a size of said exit pupil by diverging said bundle of rays emitted from said image display device.

2. An image display apparatus having means for displaying an image, and an ocular optical system for projecting said image on a user's retina, said image display apparatus comprising:

first and second diffraction means provided in an optical path lying between said image display means and an exit pupil formed by said ocular optical system, wherein said first and second diffraction means are disposed such that an angle of diffraction caused by said second diffraction means for each wavelength of said image is approximately coincident with an angle of diffraction caused by said first diffraction means, and wherein said first and second diffraction means are arranged to enlarge said exit pupil by dividing said exit pupil into a plurality of exit pupils.

3. An image display apparatus according to claim 2, which is arranged so that an angle of diffraction caused by each of said first and second diffraction means for the shortest wavelength of said image is larger than a field angle of the image projected by said ocular optical system.

4. An image display apparatus according to claim 2, further comprising field selecting means whereby light impinging thereon at a relatively small incident angle is transmitted as it is, whereas light impinging thereon at a relatively large incident angle is scattered and thus prevented from passing therethrough, said field selecting means being provided between said second diffraction means and said exit pupil.

5. An image display apparatus according to claim 2, wherein said first and second diffraction means are disposed so that the respective grating directions are coincident with each other, and the respective grating surfaces are approximately parallel to each other.

6. An image display apparatus according to claim 2, wherein said first and second diffraction means are plane diffraction gratings.

7. An image display apparatus according to claim 2, wherein said first and second diffraction means each have a grating configuration composed of a large number of grooves lined up in one direction.

8. An image display apparatus according to claim 2, wherein said first and second diffraction means each have a grating configuration composed of a large number of grooves lined up in two directions intersecting each other.

9. An image display apparatus according to claim 2, wherein said first and second diffraction means each have a surface provided with recesses and projections, said recesses and projections being arranged in a checkered pattern.

10. An image display apparatus according to claim 2, wherein said first and second diffraction means each have recesses and projections, each of said recesses and projections having a rectangular cross-sectional configuration.

11. An image display apparatus according to claim 2, wherein said first and second diffraction means each have a grating surface with a groove depth $d_0$ which satisfies the following condition:

$$2(n-1)d_0=\lambda$$

where n is the refractive index of the diffraction grating, and $\lambda$ is the wavelength of light from said image display means.

12. An image display apparatus according to claim 1 or 2, wherein said ocular optical system includes a reflecting means.

13. An image display apparatus according to claim 12, wherein said reflecting means has a concave surface directed toward said exit pupil.

14. An image display apparatus according to claim 2, wherein said first diffraction means divides a bundle of rays into a plurality of bundles of rays, said second diffraction means is constructed and arranged such that each of said bundles of rays emanates as a bundle of parallel rays, thereby arranging said plurality of exit pupils in a two-dimensional pattern.

* * * * *